July 22, 1958 M. RUBLI 2,843,876
PRESS FOR PRODUCING WELDING ELECTRODES COATED
WITH WELDING COMPOUND
Filed Feb. 8, 1955
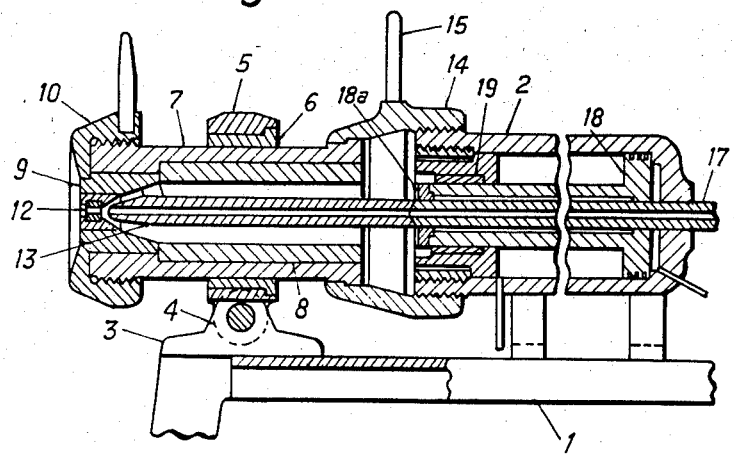
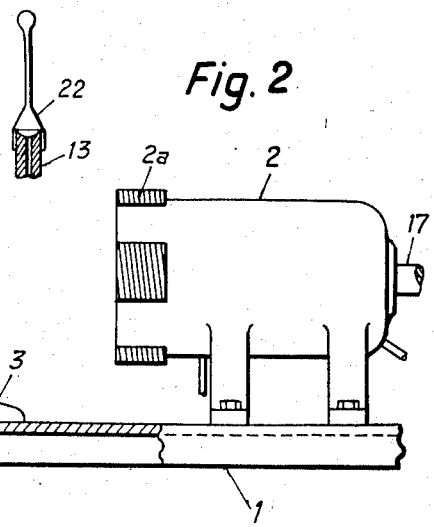
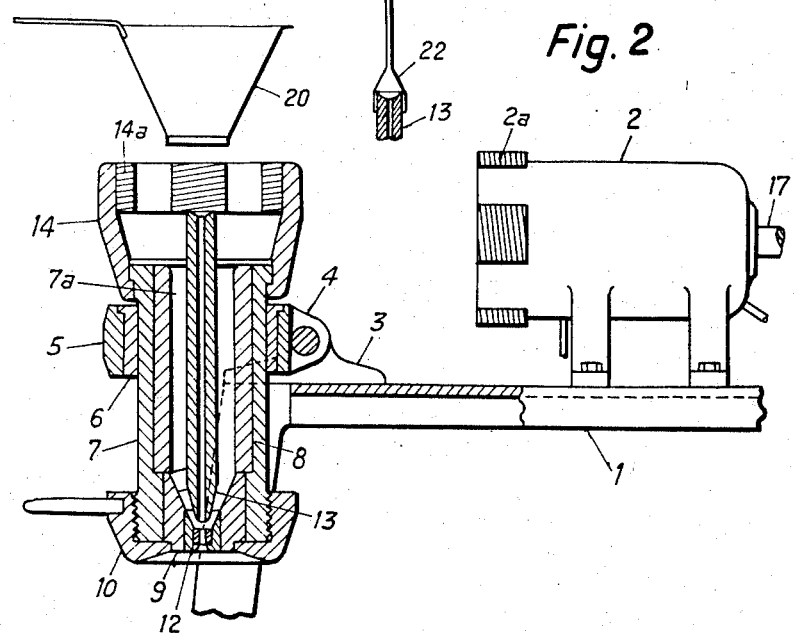
INVENTOR.
MAX RUBLI
BY Richards & Geier
ATTORNEYS

United States Patent Office 2,843,876
Patented July 22, 1958

2,843,876

PRESS FOR PRODUCING WELDING ELECTRODES COATED WITH WELDING COMPOUND

Max Rubli, Zumikon, Switzerland, assignor to Holding Intercito S. A., Zurich-Oerlikon, Switzerland, a company of Panama Application February 8, 1955, Serial No. 486,933

Claims priority, application Switzerland February 9, 1954

1 Claim. (Cl. 18—13)

The present invention relates to a press for producing welding electrodes coated with welding compound.

Electrode presses are known in which the material to be pressed is introduced in the form of a rough-pressed plug into a horizontally mounted squeezing cylinder. Among these presses there are some in which the pressing nozzle part is built into a cover swiveling about a vertical axis, which cover, like a gun closure, is secured to the squeezing cylinder by means of a rotating coupling so that the plugs can be inserted into the squeezing cylinder from the front. With other presses there is an opening or space between the cylinder for extruding the material and the hydraulic cylinder, the said opening or space being arranged in front of the hydraulic cylinder's extruding plunger when the latter is in the withdrawn position. The pre-formed plugs of material can then be introduced from the rear into the squeezing cylinder through the said opening or space.

These machines have proved excellent for mass production. On the other hand, they are not suitable for the production of special electrodes in small quantities or for the production of specimen electrodes with a special composition of the sheathing compound in powder or paste form, since in the horizontal extruding cylinder the powder or paste compound is distributed on the lower half of the cylinder.

The present invention aims at creating a press which is suitable for such work as well. The invention consists in the fact that the cylinder for extruding the compound is swivelably mounted on a horizontal axis arranged at right angles to its longitudinal axis and is tensionally connected to a pressure cylinder by means of a releasable coupling in such a way that the compound extruding cylinder can be swiveled out of its horizontal position into a vertical one for the purpose of charging it during the squeezing operation.

A typical embodiment of the machine according to the invention is illustrated in the attached drawing, in which:

Fig. 1 shows a longitudinal section of the machine with the compound extruding cylinder in the squeezing position;

Fig. 2 shows a partial longitudinal section of the machine, with the compound extruding cylinder in the charging position;

Fig. 3 shows a hopper for charging pasty or granular compound into the compound extruding cylinder;

Fig. 4 shows a funnel for covering the electrode guide tube when charging the extruding cylinder with granular or pasty compound.

Secured to the table 1 are a pressure cylinder 2 and two bearings 3. An eyelet 4 of a collar 5, in which a guide ring 6 is mounted, engages between the bearings 3. Supported in the guide ring 6 so that it is axially shiftable is the compound extruding cylinder 7 in which an exchangeable liner 8 is inserted. Firmly locked to the front end of the compound extruding cylinder 7 by means of the clamping nut 10 is an insert 9 in which the extrusion nozzle 12 is located. Mounted in the insert 9 is the front end of the electrode supply tube 13. A threaded sleeve 14 is arranged on the rear end of the compound extruding cylinder 7 so that, by means of the handle 15, the sleeve 14, as well as the cylinder 7 can be rotated and shifted in the ring 6. The thread 14a of the sleeve 14 and the appurtenant thread 2a on the cylinder 2 are interrupted, as can be seen from Fig. 2. The sleeve 14 can therefore be slipped over the pressure cylinder 2 and, by giving it a maximum turn of 45°, can be screwed tight on the said cylinder. Arranged in the pressure cylinder 2 is an electrode supply tube 17 which tapers toward its front end and is thereby centered and coupled with the electrode supply tube 13 when the compound extruding cylinder 7 is screwed against the pressure cylinder 2. In the pressure cylinder 2 the press plunger 18 is guided along the tube 17. Secured to the front end of the plunger 18 is an exchangeable guide 7 which slides over the electrode supply tube. The packing 19 serves to seal the pressure space. To charge the press with coating compound, the thread 14a is disengaged from the thread 2a by turning the handle 15 so that the compound extruding cylinder 7 can be shifted to the left until the threaded sleeve 14 abuts the ring 6. The compound extruding cylinder 7 is then swiveled into the vertical position, as shown in Fig. 2. In the case of mass production the extruding cylinder space 7a will, as hitherto, be charged with rough-formed plugs of material, and the cylinder 7 will be swiveled into the horizontal position, shifted to the right and coupled to the cylinder 2 by means of the sleeve 14. If, however, it is intended to carry out tests in which it is not worthwhile to press one plug to begin with, the hopper 20 is inserted in the sleeve 14, as shown in Fig. 3 so that powdery or pasty compound can be charged into the cylinder space 7a. To prevent powder or water from penetrating the electrode supply tube 13, the latter is covered with a sheet metal funnel 22.

Having now particularly described and ascertained the nature of my said invention and in what manner the same is to be performed, I declare that what I claim is:

Press for producing welding electrodes coated with welding compound, comprising an extruding cylinder for extruding the compound, means swingably supporting said cylinder on a horizontal axis arranged at right angles to its longitudinal axis, a pressure cylinder, and a releasable coupling interconnecting the cylinders, whereby the cylinder for extruding the compound can be swiveled out of its horizontal position into a vertical one for the purpose of charging it for the squeezing operation.

References Cited in the file of this patent

UNITED STATES PATENTS 557,505   Gloekler _____ Mar. 31, 1896

FOREIGN PATENTS 153,640   Australia _____ Oct. 15, 1953